United States Patent
Bradford et al.

(10) Patent No.: US 7,453,798 B2
(45) Date of Patent: Nov. 18, 2008

(54) ACTIVE FLOW MANAGEMENT WITH HYSTERESIS

(75) Inventors: Jeffrey P. Bradford, Rochester, MN (US); Gordon T. Davis, Chapel Hill, NC (US); Dongming Hwang, Apex, NC (US); Clark D. Jeffries, Durham, NC (US); Srinivasan Ramani, Cary, NC (US); Kartik Sudeep, Austin, TX (US); Ken V. Vu, Cary, NC (US)

(73) Assignee: Internationl Business Machines Corporation, Armonk, NY (US)

( * ) Notice: Subject to any disclaimer, the term of this patent is extended or adjusted under 35 U.S.C. 154(b) by 811 days.

(21) Appl. No.: 10/782,617

(22) Filed: Feb. 19, 2004

(65) Prior Publication Data

US 2005/0185581 A1 Aug. 25, 2005

(51) Int. Cl.
*H04L 12/00* (2006.01)
(52) U.S. Cl. .................. 370/229; 370/235; 370/412; 709/234; 709/235
(58) Field of Classification Search .............. 370/229, 370/235, 252, 392, 409, 412, 429, 230.235, 370/416, 230; 709/226, 227, 228, 229, 234, 709/253
See application file for complete search history.

(56) References Cited

U.S. PATENT DOCUMENTS

| | | | |
|---|---|---|---|
| 5,311,513 A * | 5/1994 | Ahmadi et al. | ............... 370/230 |
| 5,426,640 A | 6/1995 | Hluchyj et al. | |
| 5,920,568 A | 7/1999 | Kurita et al. | |
| 6,128,642 A * | 10/2000 | Doraswamy et al. | ........ 709/201 |

(Continued)

FOREIGN PATENT DOCUMENTS

GB 2360168 A 9/2001

(Continued)

OTHER PUBLICATIONS

Ed Bowen, Clark Jeffries, "Bandwidth Allocation for Non-Responsive Flows with Active Queue Management", IEEE, 2002, pp. 13-1 to 13-6.*

(Continued)

*Primary Examiner*—Aung S. Moe
*Assistant Examiner*—Habte Mered
(74) *Attorney, Agent, or Firm*—Joscelyn G. Cockburn; Patrick J. Daugherty; Driggs, Hogg, Daugherty & Del Zoppo, Co., LPA (57) ABSTRACT

The present invention provides for a computer network method and system that applies "hysteresis" to an active queue management algorithm. If a queue is at a level below a certain low threshold and a burst of packets arrives at a network node, then the probability of dropping the initial packets in the burst is recalculated, but the packets are not dropped. However, if the queue level crosses beyond a hysteresis threshold, then packets are discarded pursuant to a drop probability.

Also, according to the present invention, queue level may be decreased until it becomes less than the hysteresis threshold, with packets dropped per the drop probability until the queue level decreases to at least a low threshold. In one embodiment, an adaptive algorithm is also provided to adjust the transmit probability for each flow together with hysteresis to increase the packet transmit rates to absorb bursty traffic.

15 Claims, 9 Drawing Sheets

U.S. PATENT DOCUMENTS

| | | | |
|---|---|---|---|
| 6,154,446 A | 11/2000 | Kadambi et al. | |
| 6,252,849 B1* | 6/2001 | Rom et al. | 370/230 |
| 6,430,188 B1 | 8/2002 | Kadambi et al. | |
| 6,721,797 B1* | 4/2004 | Kim | 709/232 |
| 6,870,811 B2* | 3/2005 | Barker et al. | 370/235 |
| 7,082,132 B1* | 7/2006 | Beshai et al. | 370/391 |
| 2002/0018489 A1 | 2/2002 | Ambe et al. | |
| 2002/0131365 A1* | 9/2002 | Barker et al. | 370/235 |
| 2004/0218617 A1* | 11/2004 | Sagfors | 370/412 |

FOREIGN PATENT DOCUMENTS

WO    WO0139467 A1 *   5/2001

OTHER PUBLICATIONS

"Flow Control of Prioritized Data in a Multimedia Communications System", IBM Technical Disclosure Bulletin, Jan. 1994, vol. 37, Issue No. 1, pp. 531-532.

* cited by examiner

| case | On/Off (Seconds) | Hysteris Factor (n = Ht / L) | | | |
|---|---|---|---|---|---|
| | | 1.00 | 1.25 | 1.50 | 2.00 |
| B10 | 1.0/0.5 | 82.82 | 82.87 | 82.92 | 83.25 |
| B08 | 0.8/0.5 | 86.25 | 86.30 | 86.44 | 87.25 |
| B06 | 0.6/0.5 | 88.49 | 91.12 | 91.53 | 94.21 |
| B05 | 0.5/0.5 | 93.94 | 94.15 | 94.92 | 99.57 |
| B04 | 0.4/0.5 | 96.93 | 97.43 | 99.04 | 100.00 |

Packet Drop statistics:

| TRAFFIC PATTERN | WITHOUT HYSTERISIS | WITH HYSTERISIS |
|---|---|---|
| UDP long burst | 733(burst1:358, burst2:375) | 724(burst1:352, burst2:372) |
| UDP short + long burst | 437(burst1:80, burst2:357) | 384(burst1:31, burst2:353) |
| TCP Tahoe (const traffic) | 1,103 | 1,152 |
| TCP Reno (short burst) | 100(burst1:48, burst2:52) | 0 |

Packet Transmit statistics:

| TRAFFIC PATTERN | WITHOUT HYSTERISIS | WITH HYSTERISIS |
|---|---|---|
| UDP long burst | 3,116 | 3,125 |
| UDP short + long burst | 2,474 | 2,527 |
| TCP Tahoe (const traffic) | 6,249 | 6,249 |
| TCP Reno (short burst) | 2,877 | 3,087 |

ACTIVE FLOW MANAGEMENT WITH HYSTERESIS

FIELD OF THE INVENTION

This invention relates in general to bandwidth allocation and active flow management techniques for computer networks, and more particularly to implementation of hysteresis in active flow management techniques to increase network system throughput by making better use of available queue capacity.

BACKGROUND OF THE INVENTION

In computer network systems, active flow management techniques are commonly used to control the subscription and offered load of each thread data flow, along with the service rate of the network system itself, to achieve fairness of bandwidth allocation.

However, unnecessary packet drop due to short burst traffic may occur, and problems arise if there is no mechanism provided to preferentially treat short bursts of packets. Most active queue management algorithms drop some packets when congestion is detected, and indeed in an initial burst to detect incipient congestion. If the burst is sustained for a very short period, this can cause unnecessary packet drops because there is enough space in the packet buffer to be able to accommodate the burst. This is especially detrimental in Transmission Control Protocol (TCP) networks because each packet drop causes TCP retransmissions which can lead to very low useful throughput.

In TCP networks, it is known to use Explicit Congestion Notification (ECN) to mark packets and indicate to a sender that a congestion window should be adjusted to a lower rate. However, ECN applied in the case of very short and sustainable bursts can be detrimental to the total throughput because it unnecessarily causes the window to adjust when the packets in the burst could well have been transmitted only with a little price in latency. It is also known to use an exponentially weighted moving average of a queue level to smooth out bursts; however, this solution is computationally expensive.

What is needed is a method and system for active flow management for computer networks that sustains short burst packet traffic without causing unnecessary packet drops and at the same time not degrading the network system throughput for persistent bursts of packets, and which can be implemented in hardware without too much logic overhead.

SUMMARY OF THE INVENTION

The present invention provides for a computer network method and system that applies "hysteresis" to an active queue management algorithm. If a queue is at a level below a certain low threshold (L) and a burst of packets arrives at this network node, then the probability of dropping the initial packets in the burst is recalculated, but the packets are not dropped. However, if the queue level crosses beyond a "hysteresis threshold" (Ht), then packets are discarded pursuant to a drop probability. This allows more packets from the burst to get into the queue. Where the burst lasts for a short time (a "short burst"), then the present invention provides the ability to transmit every single packet.

According to the present invention, when a queue level is beyond the hysteresis threshold, and arrival rate into the queue is less than the sending rate from the queue, then queue level is decreased until it becomes less than the 'hysteresis threshold' (Ht). However, during this time, packets get dropped as per the drop probability until the queue level decreases to at least the low threshold (L). Thus, the present invention is intended to improve network performance where a burst is received into a queue when the queue level is low.

In one embodiment of the present invention, an adaptive algorithm is also provided to adjust the increment and decrement of transmit probability for each flow, together with hysteresis to increase the packet transmit rates by using packet data store to absorb bursty traffic. The proposed algorithm maintains the throughput for persistent bursts of packets. Using straight forward implementation of hysteresis in the active flow management will increase the system throughput by making better use of available queue capacity. This results in an increase in the queue level peak, potentially exposing the system to tail drops when subjected to severe bursts for bursty traffic. With the addition of adaptive increment and decrement of transmit probability of each flow, queue peak can be limited to a reasonable level, thus preventing tail drop.

DESCRIPTION OF THE PREFERRED EMBODIMENTS

The present invention applies "hysteresis" to active queue management techniques. Hysteresis is generally defined as "the lagging of an effect behind its cause" and it is well-known to use hysteresis behavior in applications that switch between two transmission modes in a variety of network system applications. In the present invention, where a queue is at a level below a certain low threshold (L) and a burst of packets arrives at this network node, then the probability of dropping the initial packets in the burst is recalculated, but the packets are not dropped. However, if the queue level crosses beyond a "hysteresis threshold" (Ht), then packets are discarded pursuant to a drop probability. This allows more packets from the burst to get into the queue. Thus, where the burst lasts for a short time (a "short burst"), then the present invention provides the ability to transmit every single packet.

According to the present invention, when a queue level is beyond the hysteresis threshold, and arrival rate into the queue is less than the sending rate from the queue, then queue level is decreased until it becomes less than the 'hysteresis threshold' (Ht). If the arrival rate into the queue is less than the sending rate from the queue, and packets arriving into the queue are not discarded, the queue level will eventually rise and, after a while, no more packets will be accepted into the queue. According to algorithms taught by the present invention, arriving packets are randomly discarded but only to the point where the queue level reaches the hysteresis threshold. However, during this time packets get dropped as per the drop probability until the queue level decreases to at least the low threshold (L). Thus, the present invention is intended to improve network performance where a burst is received into a queue when the queue level is low.

Random Early Detection is a well-known queue management algorithm that is used in network routers to detect incipient congestion based on queue occupancy. As per the definition of RED, a low (L) and a high (H) threshold are defined for the queue. An exponentially weighted average (Qavg) of the queue occupancy is used to define congestion. If Qavg is less than L, the arriving packet is not discarded. If Qavg is greater than H, the arriving packet is discarded. If Qavg lies between L and H, a discard probability is calculated for the arriving packet based on the linearly increasing probability between L and H.

Figure 1:
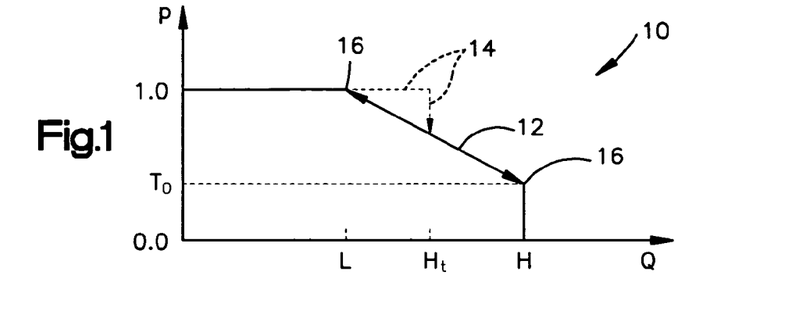
FIG. 1 is a graphical representation of the relationship of transmit probability to buffer capacity according to the present invention.

One of the drawbacks of RED is that it is not easy to set the thresholds to achieve optimum queue occupancy and network performance. Referring now to FIG. 1, a graphical representation 10 of the relationship of transmit probability p to buffer capacity Q according to the present invention is illustrated, where T represents the transmit probability; $T_0$ represents an initial value for the transmit probability; H and L represent the High and low thresholds, respectively, for Random Early Detection (RED); and Qmax represents the buffer capacity. In the example illustrated, $L=(\frac{1}{4})*Qmax$; $H=(\frac{7}{32})*Qmax$, $0<=L<=Ht<=Qmax$; $T=1-(Q-L)*(1-T_0)/(H-L)$, and $T_0=\frac{1}{8}$. However, the present invention is not limited to these values, and it is to be understood that other values may be selected for use with the present invention. The solid line 12 is the transmit probability curve when the hysteresis flag is turned OFF. The dotted line 14 is the transmit probability curve when the hysteresis flag is turned ON. If hysteresis flag (HT) is on, then discards should be delayed; otherwise, discard probability should be calculated as per the queue management scheme. Thus, according to the present invention, the queue level is treated as a vector instead of a scalar: i.e., the queue level now has a direction 16 along with a value 12 or 14.

Figure 2:
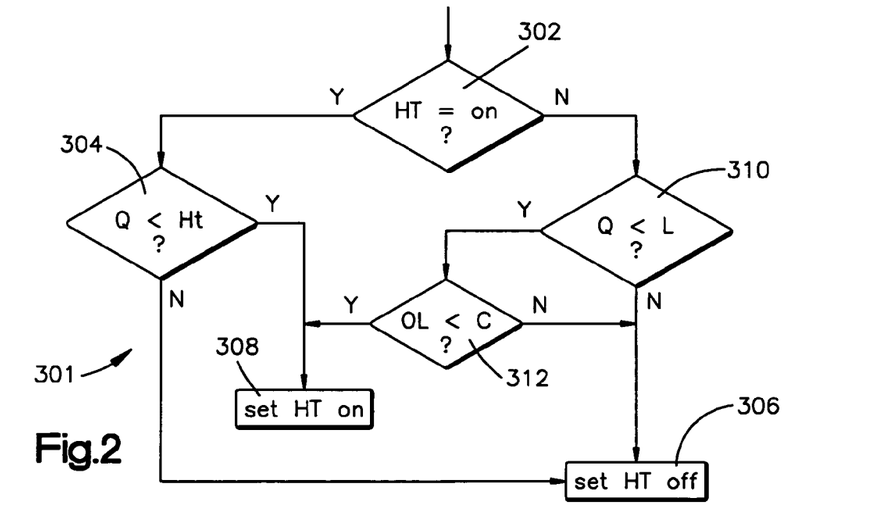
FIG. 2 is a flowchart illustrating a hysteresis algorithm according to the present invention.

FIG. 2 is a flowchart illustrating a hysteresis algorithm 301 for setting the hysteresis flag according to the present invention. At step 302, the hysteresis flag (HT) setting is ascertained. If the HT is on, then the queue level is checked at step 304 to determine whether it has increased beyond or is equal to the hysteresis threshold (Ht). If yes, then the HT flag is switched OFF at step 306. Otherwise, the HT flag is kept ON at step 308.

Alternatively, if the HT is OFF at step 302, then the queue level is checked at step 310 to determine whether it has decreased to a value below the low threshold (L): if not, then the HT flag remains switched OFF at step 306; if so, then at step 312, it is determined whether the offered load (OL) is below the link capacity (C). Offered load is defined to be the aggregate traffic bandwidth being presented to the link between two nodes in a network by a data transmitter. Link Capacity is defined as the maximum bandwidth supported by a physical link between two nodes in a network. If OL is below C at step 312, then the HT flag is switched ON at step 308ON (this implies that the incoming flows are well behaved); otherwise, the HT flag remains switched OFF at step 306.

Figure 3:
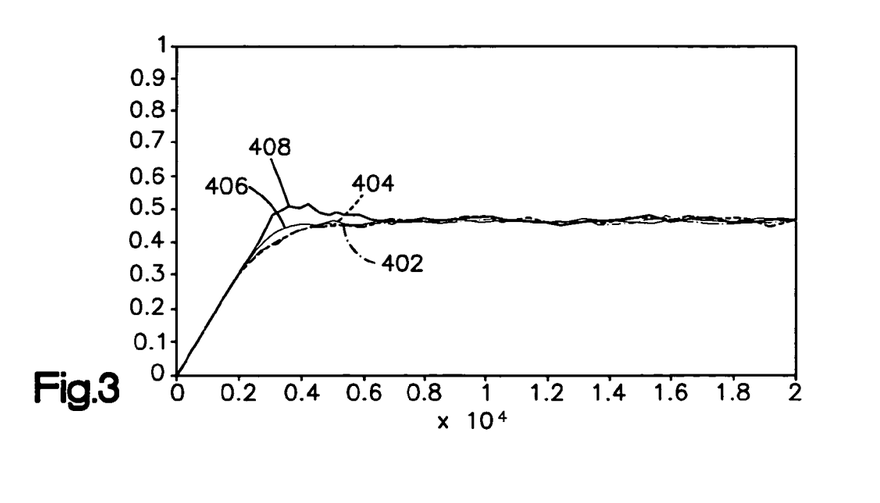
FIG. 3 is a graphical representation of results for queue occupancy for hysteresis factor levels according to the present invention.

The hysteresis algorithm 301 described above has been tested under constant traffic load as well as under bursty traffic load. Embodiments of the present invention have been implemented on two separate models: a Network processor simulation engine (NPSim) and an independent Network simulator (ns-2). As shown in FIG. 3 et seq, there is considerable improvement in network throughput by using hysteresis on RED according to the present invention. Under the constant load conditions, traffic sent into the NPSim network processor simulation model running the algorithm 301 oversubscribed the link by 50%. A hysteresis factor (n) is defined as the ratio of the hysteresis threshold to the low threshold of RED, thus Ht=n*L. Results for queue occupancy for four levels of the hysteresis factor are shown in FIG. 3: level 402 where n=1; level 404 where n=1.25; level 406 where n=1.5, and level 408 where n=2. Note that applying hysteresis to a constant load does not affect the throughput of the flow control scheme adversely. In fact, the initial hump 410 for case 408 where n=2 helps to slightly improve the throughput.

Figure 4:
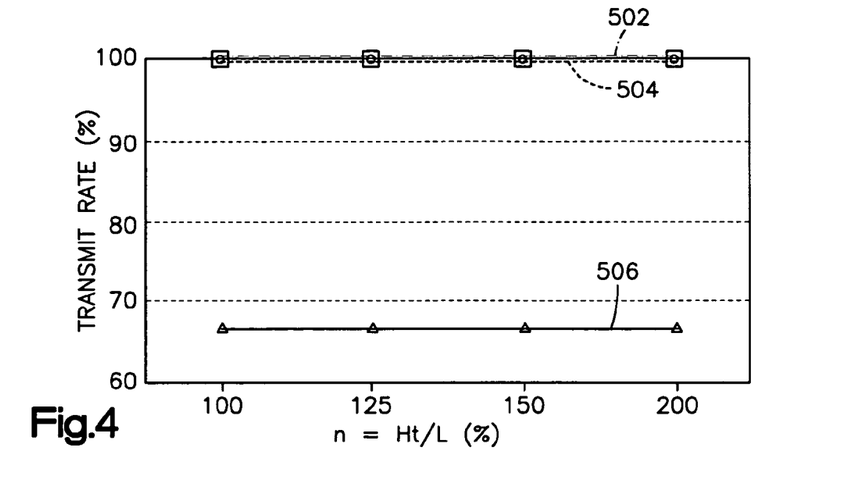
FIG. 4 is a graphical representation of the transmit rates for various levels of hysteresis according to the present invention.

FIG. 4 illustrates the transmit rates for various levels of Hysteresis. For case C1 502, the offered load (OL) is 50% of link capacity (C). For case C2 504, the offered load is 100% of link capacity. And for case C3 506, the offered load is 150% of link capacity. Note that for C3 506, 66.7% of traffic is transmitted.

Figure 5:
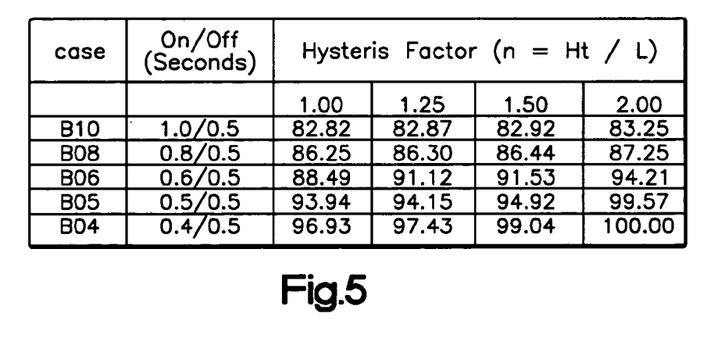
FIG. 5 is a table of transmit rates for bursty traffic according to the present invention.

FIG. 5 illustrates transmit rates for bursty traffic; 150% of link capacity is sent during the BURST ON period, and 20% of link capacity is sent during the BURST OFF period. The BURST ON and OFF periods are varied for different levels of oversubscription.

Figure 6:
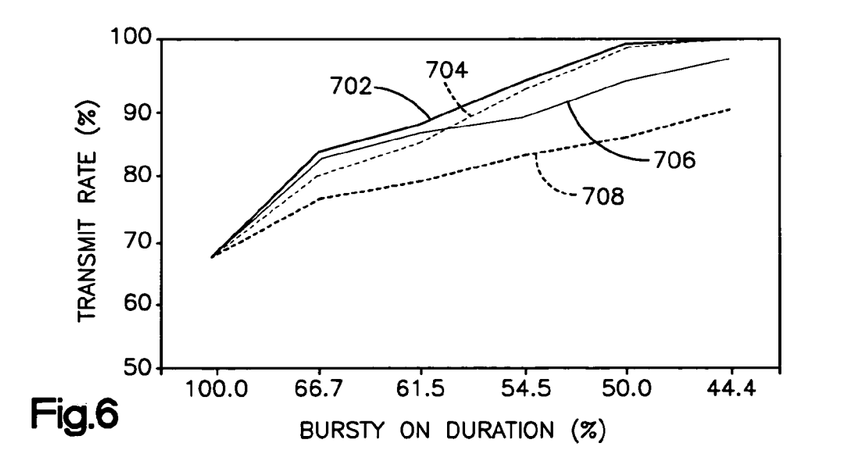
FIG. 6 is a graphical representation of a transmit rate throughput comparison for bursty traffic for RED, RED with hysteresis, SARED and SARED with hysteresis according to the present invention.

FIG. 6 illustrates a transmit rate throughput comparison for bursty traffic for RED 706, RED with hysteresis 702, Shock Absorber Random Early Detection (SARED) 708 and SARED with hysteresis 704. Further information about SARED is set forth in commonly-assigned U.S. patent application entitled "FLOW CONTROL IN COMPUTER NETWORKS", Ser. No. 10/160,507, filed Jun. 3, 2002, which is incorporated herein by this reference. For Both RED and SARED queue management schemes, there is a considerable improvement in the transmit rates for bursty traffic when hysteresis is applied to the scheme.

Figure 7:
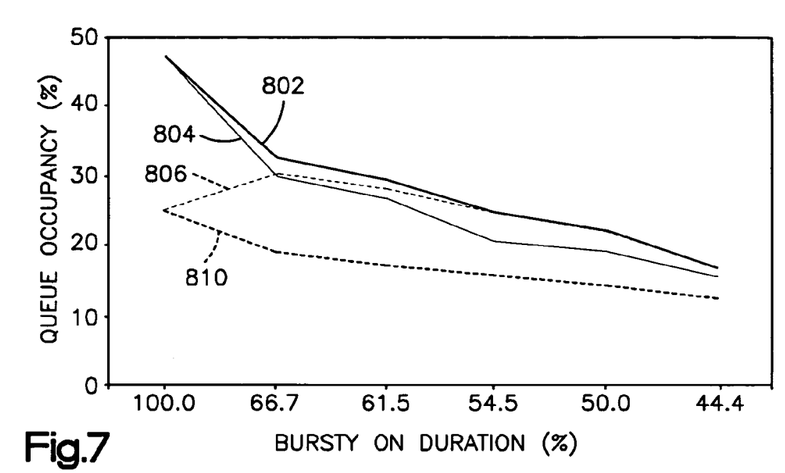
FIG. 7 is a graphical representation of a latency comparison for bursty traffic for RED, RED with hysteresis, SARED and SARED with hysteresis according to the present invention.

FIG. 7 illustrates a latency comparison for bursty traffic for RED 804, RED with hysteresis 802, SARED 810 and SARED with hysteresis 806. This illustration shows the price that needs to be paid in terms of additional queue occupancy (which can be translated into latency) for achieving the higher throughput. In all cases, the queue occupancy increases only marginally.

Figure 8:
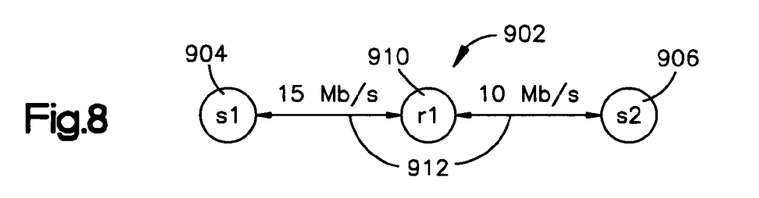
FIG. 8 is a high-level block diagram of a standalone network simulator appropriate for use with the present invention.

FIG. 8 is a block diagram of a standalone network simulator NS-2 902 for use with the present invention. A node s1 904 sends traffic to a node s2 906 via router r1 910. An active queue management algorithm (RED) runs at r1, with a packet size of 1000 bytes. Note that the r1-s2 link 912 is oversubscribed by 50%, with a buffer size at r1 of 600 packets, and Ht=L for no hysteresis, Ht=2L for hysteresis.

Figure 9:
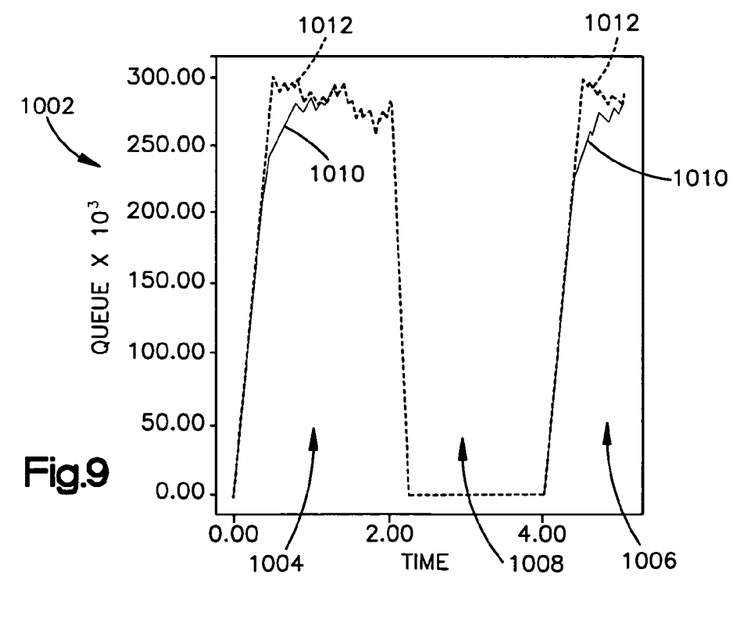
FIG. 9 is a graphical representation of UDP traffic on the standalone network simulator of FIG. 9 according to the present invention.

Results of testing the hysteresis algorithm 301 on a User Datagram Protocol (UDP) traffic first Case 1002 on the NS-2 902 are illustrated in FIG. 9. There are 2 bursts 1004 and 1006 in the simulation. Each burst 1004 and 1006 lasts for 2 seconds. An OFF period 1008 between the burst 1004 and 1006 is also two seconds, resulting in queue occupancy for RED 1010 and RED-with-hysteresis 1012 as shown.

Figure 10:
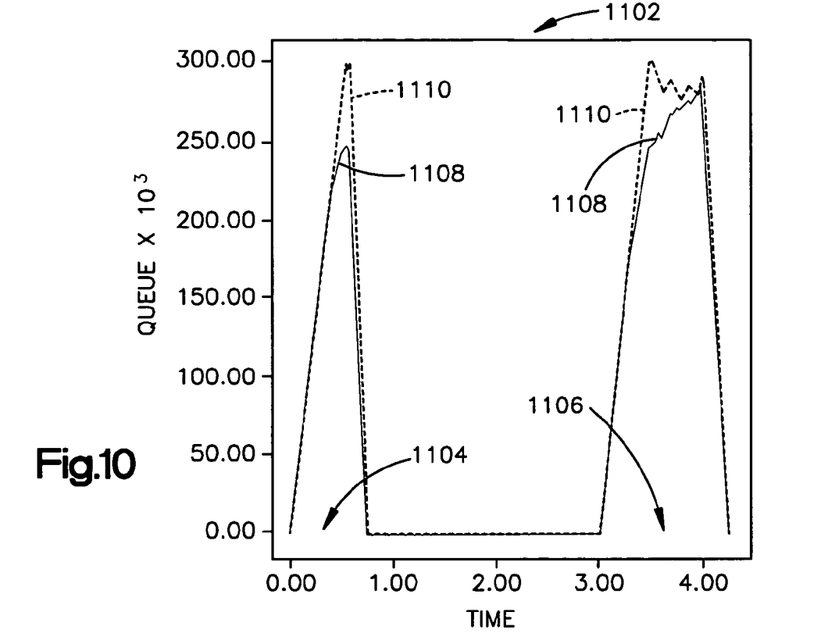
FIG. 10 is a graphical representation of UDP short burst bursty traffic on the standalone network simulator of FIG. 9 according to the present invention.

Results of testing the hysteresis algorithm 301 on a UDP short burst bursty traffic Case 1102 on the NS-2 902 are illustrated in FIG. 10. Two bursts 1104 and 1106 are run in the simulation. The first burst 1104 lasts from 0 sec. to 0.5 sec. and the second burst 1106 lasts from 3.0 sec. to 4.0 sec., with resultant queue occupancy for RED 1108 and RED-with-hysteresis 1110.

Figure 11:
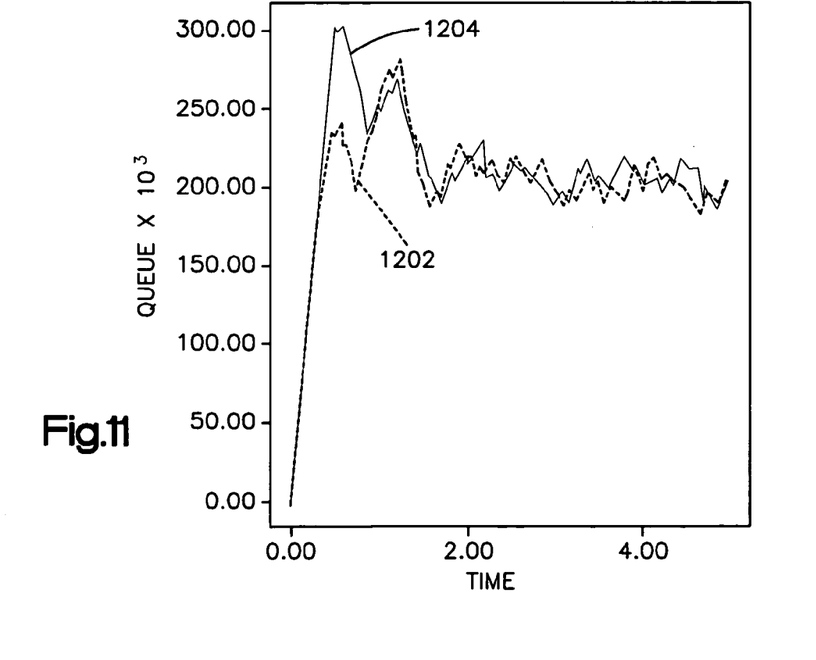
FIG. 11 is a graphical representation of TCP constant traffic on the standalone network simulator of FIG. 9 according to the present invention.

FIG. 11 illustrates TCP Tahoe constant traffic on the standalone network simulator 902, wherein queue occupancy is shown for RED 1202 and RED-with-hysteresis 1204.

Figure 12:
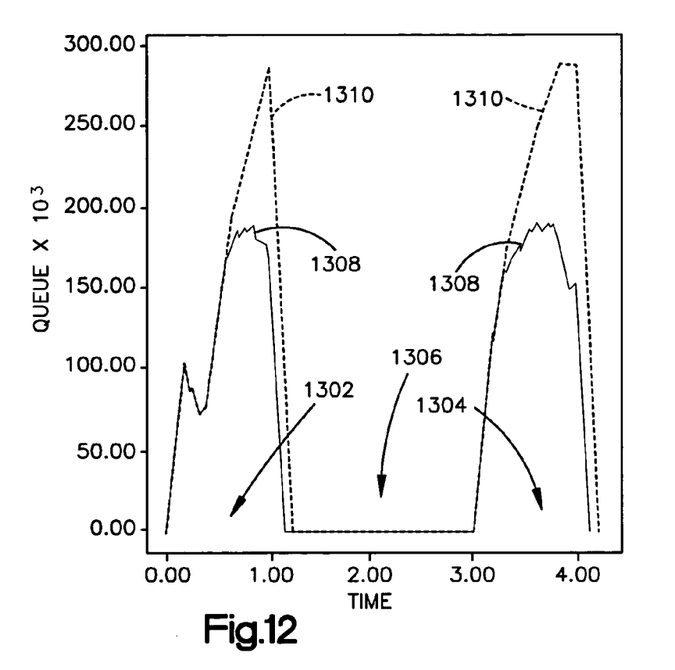
FIG. 12 is a graphical representation of TCP bursty traffic on the standalone network simulator of FIG. 9 according to the present invention.

FIG. 12 illustrates TCP Reno bursty traffic on the standalone network simulator 902. Two bursts 1302 and 1304 each last for one second, with an intervening OFF period 1306 of one second, wherein queue occupancy is shown for RED 1308 and RED-with-hysteresis 1310.

Figure 13:
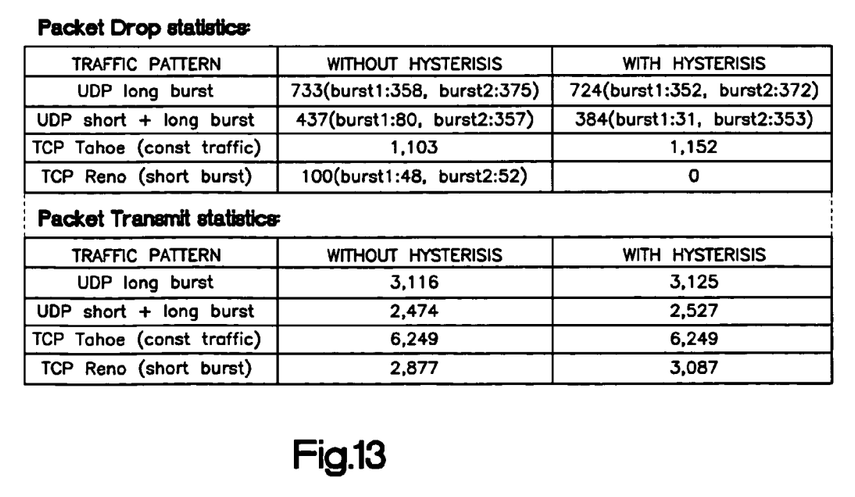
FIG. 13 provides tables of packet drop and packet transmit statistics according to the present invention.

Lastly, FIG. 13 provides tables of packet drop and packet transmit statistics according to the present invention.

In another embodiment of the present invention, an adaptive algorithm is also provided to adjust the increment and decrement of transmit probability for each flow, together with hysteresis to increase the packet transmit rates by using packet data store to absorb bursty traffic. The proposed algorithm maintains the throughput for persistent bursts of packets. Using straight forward implementation of hysteresis alone in the active flow management will increase the system throughput by making better use of available queue capacity. However, this results in an increase in the queue level peak, potentially exposing the system to tail drops when subjected to severe bursts for bursty traffic. With the addition of adaptive increment and decrement of transmit probability of each flow, queue peak can be limited to a reasonable level, thus preventing tail drop.

An embodiment of the invention thus proposes an algorithm including the following two components to improve the performance of active flow management: (1) a Bandwidth Allocation Transmit (BAT) algorithm, without SARED but with hysteresis; and (2) an adaptive transmit fraction Ti responsive to certain conditions (e.g., queue and/or traffic).

Further information about BAT is set forth in commonly-assigned U.S. patent applications entitled "METHOD AND SYSTEM FOR PROVIDING DIFFERENTIATED SERVICES IN COMPUTER NETWORKS", Ser. No. 09/448, 197, filed Nov. 23, 1999, now U.S. Pat. No. 6,657,960 B1, issued to Jeffries et al. on Dec. 2, 2003; and "METHOD AND SYSTEM FOR CONTROLLING FLOWS IN SUB-PIPES OF COMPUTER NETWORKS", Ser. No. 09/540,428, filed Mar. 31, 2000, both of which are incorporated herein by this reference.

Pursuant to the U.S. Pat. No. 6,657,960 B1 and U.S. patent application Ser. No. 09/540 428 references incorporated above, with regard to (1) the first part of the two-part algorithm (BAT without SARED but with hysteresis), the Transmit fraction of BAT for flow i, Ti, is defined as follows:

If $fi(t) < fi,min$ then $Ti(t+dt) = \min(1, Ti(t)+w)$;

else if $fi(t) > fi,max$ then $Ti(t+dt) = Ti(t)(1-w)$;

else if $B(t) = 1$ then $Ti(t+dt) = \min(1, Ti(t) + Ci\text{Bavg}(t))$;

otherwise then $Ti(t+dt) = Ti(t)(1 - DiOi(t))$;

where Ci and Di are constants used for increment and decrement, respectively, of Ti, fi,min is the minimum flow for the $i^{th}$ pipe, and fi,max is the maximum flow for the $i^{th}$ pipe. Ci and Di are defined by subscription of each flow, fi,min, and the service rate of the system, S. They are given as follows:

$Ci = (S + fi,min - (f1,min + f2,min + \ldots + fn,min))/16$; and $Di = (S - fi,min) * 4$.

Hysteresis is incorporated according to the following algorithm: if hysteresis is on and the queue level is less than the hysteresis threshold, then no packet will be dropped—i.e., Ti is updated but does not apply to packets; else, if hysteresis is off, then packets are processed as normal—i.e. Ti is applied to each packet.

With regard to (2) the second part of the two-part algorithm (adaptive transmit fraction Ti based on certain conditions), prior art implementations of BAT have been guarded by SARED which will reduce Ti when queue occupancy exceeds the SARED threshold, e.g., 25% of maximum queue capacity. With hysteresis, there is no need for SARED to guard BAT. However, this may increase the queue level peak which may cause tail drop due to high queue occupancy. In order to prevent packets from tail drop, the present invention provides for an adaptive increment and decrement of transmit probability of each flow, Ti, to prevent tail drop while maintaining the advantage of hysteresis, e.g. higher transmit rates with bursty traffic. An embodiment of the present invention comprises a normal Ti algorithm with an extended Ti algorithm to adapt Ti for good conditions (low queue and/or light traffic) and severe conditions (high queue and/or severe traffic), respectively.

For conditions between good and severe, an adaptive increment and decrement of Ti is used based on the condition of traffic or the direction the queue level is moving. "Severe conditions" implies that no amount of congestion control will be able to prevent the discard of arriving packets. Referring again to FIG. 1, this is the case where the queue level (on the x axis) has reached the high threshold (H), beyond which the drop probability is=1. Between L and H (i.e. between the good and severe conditions) is where the flow control lies—and with regard to (2), this is an adaptive increment and decrement of Ti unlike a fixed change in Ti as was done in (1). The advantages of the proposed algorithm include using queue data store to absorb short burst traffic to achieve higher throughput, and adjusting increment and decrement of transmit probability for each flow to limit queue peak to prevent tail drop.

Figure 14:
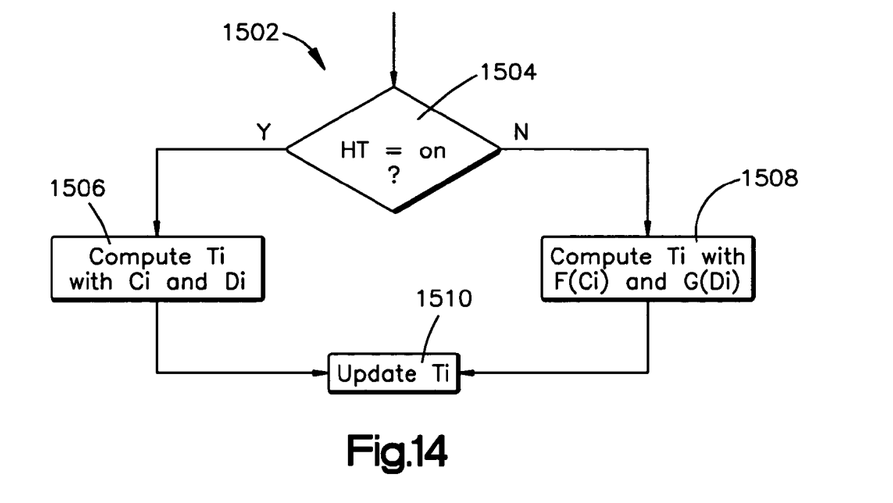
FIG. 14 is a flowchart that shows an adaptive algorithm according to the present invention.

FIG. 14 illustrates an adaptive algorithm 1502 according to the present invention of Ti using hysteresis as good or severe condition indicator for flow i, given constants Ci and Di calculated from subscription of flow i and service rate of the system. In step 1504, the HT flag is determined. If HT is ON, then in step 1506 Ti is computed using Ci and Di in BAT. Else, if HT is OFF, then in step 1508 Ti is computed using F(Ci) and G(Di) in BAT, where F is a decreasing function and G is an increasing function. One embodiment sets F(C)=C/2 and G(D)=min(1, 2*D); however, other embodiments may utilize different values, and the present invention is not limited to these values. After step 1506 or step 1508, in step 1510, the Ti is updated.

HT is set according to algorithm 301 of FIG. 2. Given low threshold L, high threshold H, and hysteresis threshold Ht where 0<=L<=Ht <=H<=maximum queue capacity. Hysteresis is ON initially. It is preferred that both Ti and HT are updated periodically and the period is dependent on queue size and service rate. When hysteresis is ON and the queue level is less than the hysteresis threshold, no packet will be dropped. When hysteresis is OFF, Ti is applied to every packet.

The benefit of the present invention is demonstrated by simulation results shown in FIGS. 15 through 19. These simulations use hysteresis as an indicator of good and severe conditions. In these simulations, F(Ci)=Ci/(2^3) and G(Di)=min(1, 2^3*Di) are used. The hysteresis threshold Ht is 2*(low threshold). The simulation contains seven cases and each has constant burst OFF duration for 1.07 ms except for the case of 100% burst ON duration. The respective "burst ON" durations for the seven cases are: case 1602—100%; case 1604—66.6%; case 1606—61.5%; case 1608—54.5%; case 1610—50.0%; case 1612—44.4%; and case 1614—37.4%. For example, the traffic pattern for the 66.6% burst ON duration case 1604 is made by the cycles of 2.13 ms burst ON and followed by 1.07 ms burst OFF. The traffic pattern is 150% subscription when bursty traffic is ON and 20% subscription when bursty traffic is OFF.

The simulations shown in FIGS. 15 through 19 contain four (4) UDP flows, and the subscriptions of each flow are: 10%, 10%, 20%, and 0% of total bandwidth, respectively. The offered load for each flow is 50%, 40%, 20%, and 40% of total bandwidth, respectively, when burst is ON and 5% for each when burst is OFF. Note that the fourth flow is best effort—it will only avail of the bandwidth that is left over after allocation to the remaining flows. According to a min-max algorithm, the ideal transmit rates for each flow under constant case (100% burst ON) are 60%, 75%, 100%, and 50%, respectively.

Figure 15:
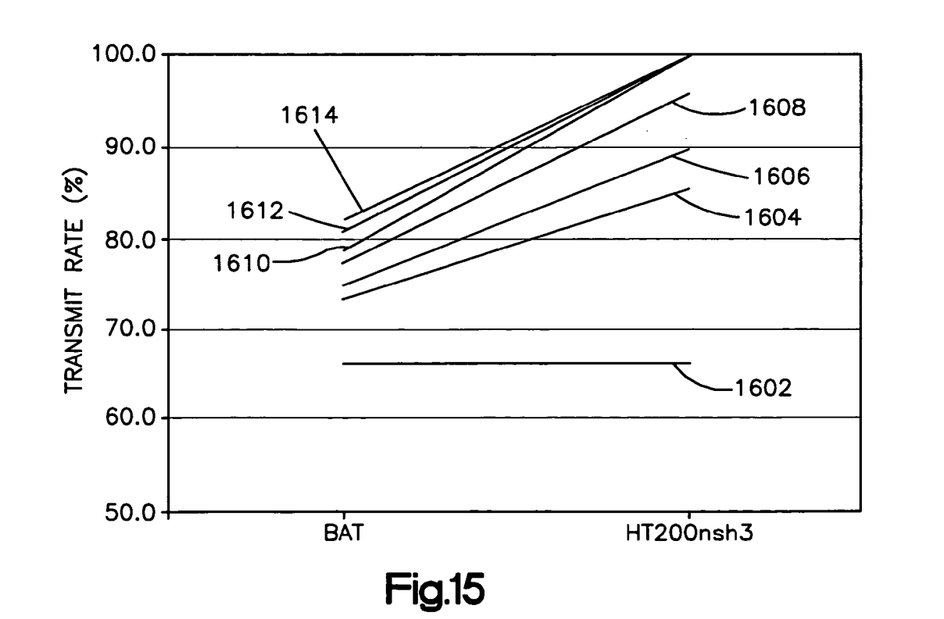
FIG. 15 is a graphical representation of aggregate transmit rates according to the present invention.
Figure 16:
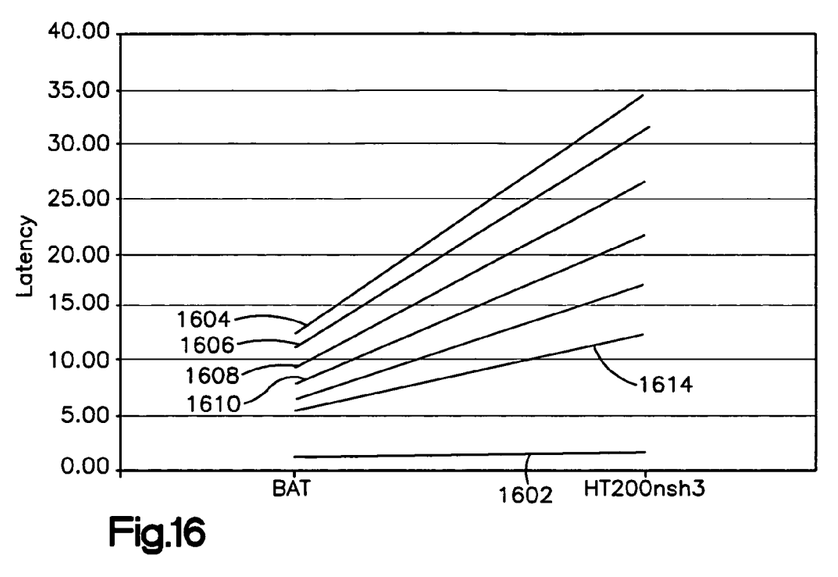
FIG. 16 is a graphical representation of average latency according to the present invention.

The aggregate transmit rates are illustrated in FIG. 15, and average latency for the same cases are shown is in FIG. 16 for various bursty traffic. FIGS. 15 and 16 show that the proposed invention can result in higher transmit rates for bursty traffic while having higher latency because of the use of queue capacity to absorb bursty traffic.

Figure 17:
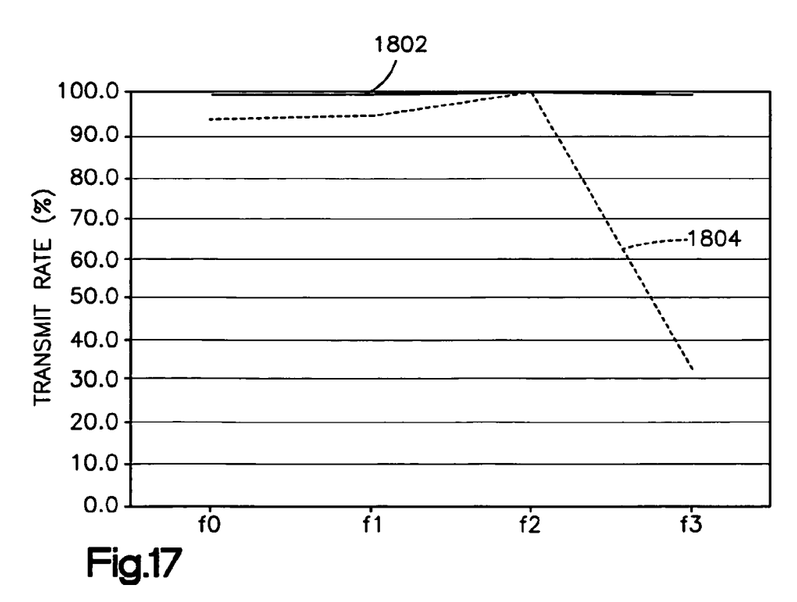
FIG. 17 is a graphical representation of aggregate transmit rates according to the present invention.
Figure 18:
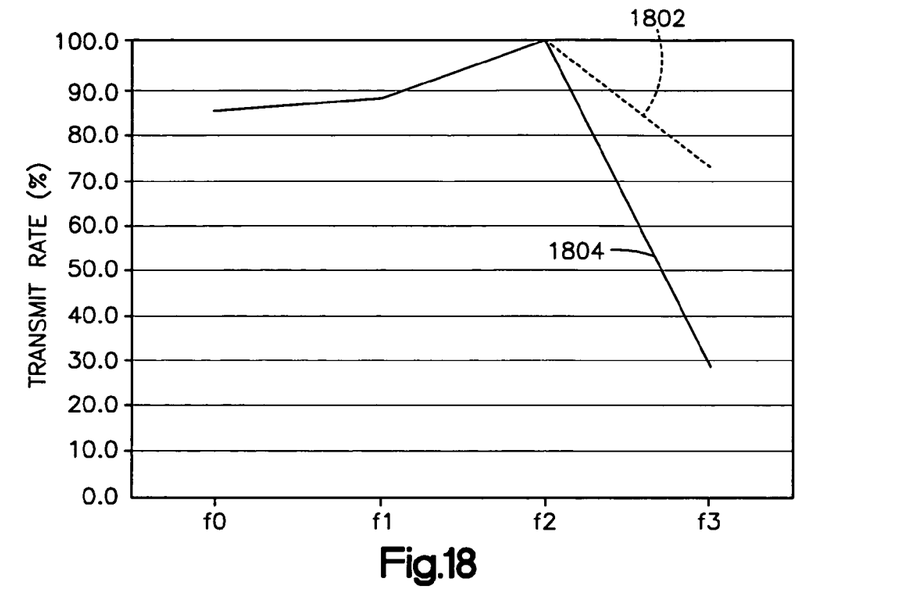
FIG. 18 is another graphical representation of aggregate transmit rates according to the present invention.
Figure 19:
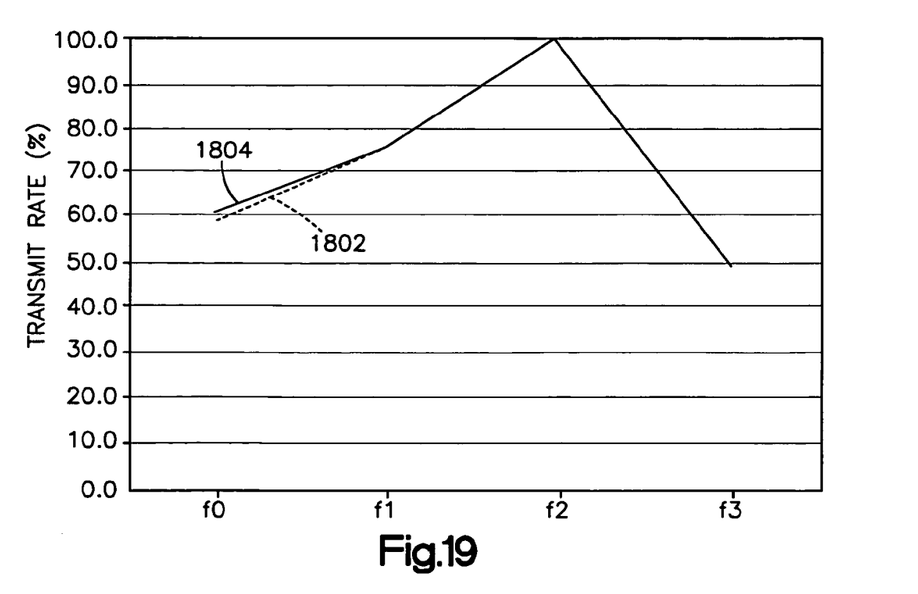
FIG. 19 is a graphical representation of aggregate transmit rates for steady traffic according to the present invention.

Specific transmit rates for individual flows obtained through the algorithms of the present invention 1802 and through prior art BAT methods 1804 are illustrated in FIGS. 17, 18, and 19. FIG. 17 is the aggregate transmit rate for each flow for 50.0% burst, and FIG. 18 is the aggregate transmit rate for each flow for 66.7% burst.

FIGS. 17 and 18 show higher transmit rates for each flow for different burstyness. They illustrate that the present invention obtains higher transmit rates for bursty traffic through better use of available queue capacity to accommodate bursty traffic. FIG. 19 is the aggregate transmit rate for each flow for steady traffic (100% burst). It shows that the algorithm according to the present invention can maintain the same transmit rate for steady, or persistent bursty, traffic.

Overall, the present invention can achieve higher aggregate transmit rates for a variety of traffic burst characteristics by making better use of queue capacity and can maintain the level of performance for persistent traffic.

The algorithm for hysteresis with adaptive increment and decrement of transmit rate can also be easily applied to Weighted RED (WRED) to achieve higher transmit rates. In this case, a different Ht threshold could be defined for each of the flows subscribing to the available bandwidth along with the individual definitions of their low (Li) and high (Hi) thresholds. When the hysteresis flag is turned ON, the probability of dropping can be decreased by twice of what it would be when the hysteresis flag is turned OFF, thereby accepting more packets into the queue when there is less congestion.

Figure 20:
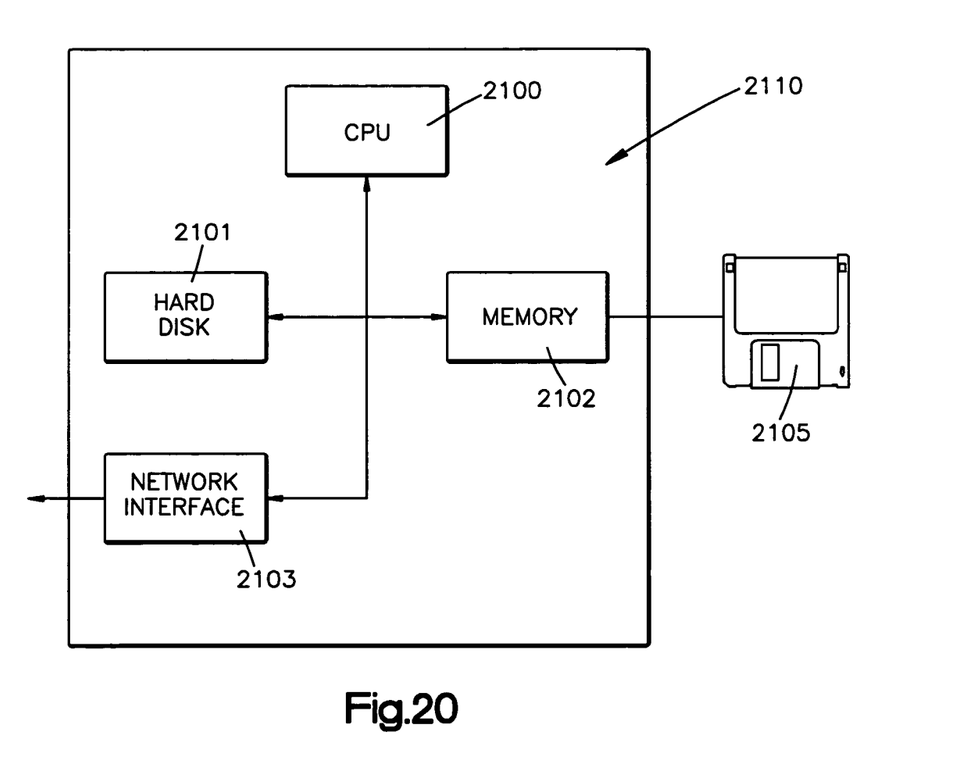
FIG. 20 illustrates an embodiment of the invention tangibly embodied in a computer program residing on a computer readable medium.

The invention may be tangibly embodied in a computer program residing on a computer-readable medium, such as the floppy disc 2105 or hard drive 2101 shown in FIG. 20. The medium 2105 may comprise one or more of a fixed and/or removable data storage device, such as a floppy disk or a CD-ROM, or it may consist of some other type of data storage. The computer program may be loaded into the memory 2102 of a network manager computer device 2110 for execution. The computer device 2110 may be connected to a network via network interface 2103. The computer program comprises instructions which, when read and executed by the computer device 2110, causes the computer device 2110 to perform the steps necessary to execute the steps or elements of the present invention.

The foregoing description of the exemplary embodiment of the invention has been presented for the purposes of illustration and description. It is not intended to be exhaustive or to limit the invention to the precise forms disclosed. Many modifications and variations are possible in light of the above teaching. It is intended that the scope of the invention be limited not with this detailed description, but rather by the claims appended hereto.

What is claimed is:

1. A method for managing and transmitting a plurality of data packets through a queue in a computer network system, comprising the steps of:
   determining a transmit probability of a computer network system queue as a function of an average occupancy level;
   determining a low level threshold for the queue as a fraction of a maximum capacity of the queue wherein the transmit probability is one;
   determining a hysteresis level threshold for the queue as a positive hysteresis factor multiple of the low level threshold wherein the hysteresis level threshold is greater than the low level threshold and less than the maximum capacity of the queue;
   initializing a hysteresis flag to ON;
   in response to the queue receiving a first burst of packets wherein the hysteresis flag is set to ON:
   (a) comparing a queue level to the hysteresis level threshold, and
   (b) if the queue level is less than the hysteresis level threshold, the queue receiving and transmitting the first burst and revising the transmit probability; or
   (c) else randomly dropping at least one packet from the first burst responsive to the transmit probability and transmitting a remainder of the first burst packets, revising the transmit probability and resetting the hysteresis flag to OFF;

in response to the queue receiving a subsequent burst of packets:
  determining an ON/OFF state of the hysteresis flag;
  if the determined hysteresis flag state is ON, then performing the hysteresis level threshold (a) comparing and (b) receiving, transmitting and revising or (c) dropping, transmitting, revising and resetting steps with respect to the subsequent burst; or
  if the determined hysteresis flag state is OFF, then comparing a queue level to the low level threshold, and
  if the queue level is less than the low level threshold and an aggregate traffic bandwidth presented to a network link connecting the queue to a node transmitting the subsequent burst is less than a maximum bandwidth capacity supported by the link, the queue receiving and transmitting the subsequent burst, revising the transmit probability, and resetting the hysteresis flag to ON; or
  else the queue receiving the subsequent burst, randomly dropping at least one packet from the subsequent burst in response to the transmit probability, transmitting a remainder of the subsequent burst packets, and revising the transmit probability.

2. The method of claim 1, further comprising periodically updating the transmit probability and the hysteresis level threshold as a function of size of the queue and the aggregate traffic bandwidth.

3. The method of claim 2, wherein determining or revising the transmit probability is a function of the hysteresis flag state.

4. The method of claim 3, wherein determining or revising the transmit probability comprises defining the transmit probability as a transmit fraction Ti as a function of a data flow parameter fi and a service rate S of the network system by applying a bandwidth allocation transmit algorithm comprising;
  determining if the hysteresis flag is ON or OFF;
  if the flag is ON, incrementing or decrementing Ti by:

if $fi(t)<=fi,min$, then $Ti(t+dt)=\min(1, Ti(t)+w)$;

if $fi(t)>fi,max$, then $Ti(t+dt)=Ti(t)(1-w)$;

if an excess bandwidth signal B(t)=1, then Ti(t+dt)=min(1, Ti(t)+CiBavg(t)); or else, $Ti(t+dt)=Ti(t)(1-DiOi(t))$;

where Oi(t) is a current offered rate of the flow and Ci is an increment constant equal to (S+fi,min−(f1,min+f2,min+ ... +fn,min))/16, and Di is a decrement constant equal to (S−fi,min)*4, or
  if the hysteresis flag is OFF, incrementing or decrementing Ti by:
    if the queue level is increasing, setting Ti=F(Ci), wherein F(Ci) is a bandwidth allocation transmit decreasing function; or
    if the queue level is decreasing, setting Ti=G(Di), wherein G(Di) is a bandwidth allocation transmit increasing function.

5. The method of claim 4, wherein F(Ci)=Ci/2 and G(Di)=min(1,2*Di).

6. A data flow manager configured for managing and transmitting data packets through a queue in a computer network system, comprising:
  a queue having a queue level in communication with the data flow manager; and
  a node in communication with the queue through a network link, the link having a maximum bandwidth capacity;
  wherein the data flow manager is configured to:
  determine a transmit probability of the queue as a function of an average queue occupancy level;
  determine a low level threshold for the queue as a fraction of a maximum capacity of the queue wherein the transmit probability is one;
  determine a hysteresis level threshold for the queue as a positive hysteresis factor multiple of the low level threshold wherein the hysteresis level threshold is greater than the low level threshold and less than the maximum capacity of the queue;
  in response to the queue receiving a first burst of packets wherein a hysteresis flag is set to ON:
    (a) compare a queue level to the hysteresis level threshold, and
    (b) if the queue level is less than the hysteresis level threshold, cause the queue to receive and transmit the first burst, the data manager further configured to revise the transmit probability; or
    (c) else cause the queue to randomly drop at least one packet from the first burst responsive to the transmit probability and transmit a remainder of the first burst packets, the data manager further configured to revise the transmit probability and reset the hysteresis flag to OFF;
  in response to the queue receiving a subsequent burst of packets:
    determine an ON/OFF state of the hysteresis flag;
    if the determined hysteresis flag state is ON, performing the hysteresis level threshold (a) compare and (b) receive, transmit and revise or (c) drop, transmit, revise and reset steps with respect to the subsequent burst; or
    if the determined hysteresis flag state is OFF, compare a queue level to the low level threshold, and:
      if the queue level is less than the low level threshold and an aggregate traffic bandwidth presented to the network link is less than the maximum bandwidth capacity, cause the queue to receive and transmit the subsequent burst, the data manager further configured to revise the transmit probability and reset the hysteresis flag to ON; or
      else cause the queue to receive the subsequent burst, randomly drop at least one packet from the subsequent burst in response to the transmit probability, and transmit a remainder of the subsequent burst packets, the data manager further configured to revise the transmit probability.

7. The data flow manager of claim 6 further configured to periodically update the transmit probability and the hysteresis level threshold as a function of size of the queue and the aggregate traffic bandwidth.

8. The data flow manager of claim 7 further configured to determine or revise the transmit probability as a function of the hysteresis flag state.

9. The data flow manager of claim 8 further configured to determine or revise the transmit probability by defining the transmit probability as a transmit fraction Ti as a function of a data flow parameter fi and a service rate S of the network system by applying a bandwidth allocation transmit algorithm by:
  determining if the hysteresis flag is ON or OFF;
  if the flag is ON, incrementing or decrementing Ti by:

if $fi(t)<=fi,min$, then $Ti(t+dt)=\min(1, Ti(t)+w)$;

if $fi(t)>fi,max$, then $Ti(t+dt)=Ti(t)(1-w)$;

if an excess bandwidth signal B(t)=1, then Ti(t+dt)=min(1, Ti(t)+CiBavg(t); or else, $Ti(t+dt)=Ti(t)(1-DiOi(t))$;

where Oi(t) is a current offered rate of the flow and Ci is an increment constant equal to (S+fi,min−(fl,min+f2, min +...+fn,min))/16, and Di is a decrement constant equal to (S−fi,min)*4; or if the hysteresis flag is OFF, incrementing or decrementing Ti by:
  if the queue level is increasing, setting Ti=F(Ci), wherein F(Ci) is a bandwidth allocation transmit decreasing function; or
  if the queue level is decreasing, setting Ti=G(Di), wherein G(Di) is a bandwidth allocation transmit increasing function.

10. The data flow manager of claim 9, wherein F(Ci)=Ci/2 and G(Di)=min(1,2*Di).

11. An article of manufacture comprising a computer usable medium having a computer readable program embodied in said medium, wherein the computer readable program, when executed on a computer, causes the computer to manage network data flow by:
  determining a transmit probability of a computer network system queue as a function of an average occupancy level;
  determining a low level threshold for the queue as a fraction of a maximum capacity of the queue wherein the transmit probability is one;
  determining a hysteresis level threshold for the queue as a positive hysteresis factor multiple of the low level threshold wherein the hysteresis level threshold is greater than the low level threshold and less than the maximum capacity of the queue;
  initializing a hysteresis flag to ON;
  in response to the queue receiving a first burst of packets wherein the hysteresis flag is set to ON:
    (a) comparing a queue level to the hysteresis level threshold, and
    (b) if the queue level is less than the hysteresis level threshold, causing the queue to receive and transmit the first burst, the computer system revising the transmit probability; or
    (c) else causing the queue to randomly drop at least one packet from the first burst responsive to the transmit probability and transmit a remainder of the first burst packets, the computer system revising the transmit probability and resetting the hysteresis flag to OFF;
  in response to the queue receiving a subsequent burst of packets:
    determining an ON/OFF state of the hysteresis flag;
    if the determined hysteresis flag state is ON, then performing the hysteresis level threshold (a) comparing and (b) receiving, transmitting and revising or (c) dropping, transmitting, revising and resetting steps with respect to the subsequent burst; or
    if the determined hysteresis flag state is OFF, comparing a queue level to the low level threshold, and
      if the queue level is less than the low level threshold and an aggregate traffic bandwidth presented to a network link connecting the queue to a node transmitting the subsequent burst is less than a maximum bandwidth capacity supported by the link, causing the queue to receive and transmit the subsequent burst, the computer system revising the transmit probability and resetting the hysteresis flag to ON; or
      else causing the queue to receive the subsequent burst and randomly drop at least one packet from the subsequent burst in response to the transmit probability and transmit a remainder of the subsequent burst packets, the computer system revising the transmit probability.

12. The article of manufacture of claim 11, wherein the computer readable program, when executed on a computer, further causes the computer to manage network data flow by periodically updating the transmit probability and the hysteresis level threshold as a function of size of the queue and the aggregate traffic bandwidth.

13. The article of manufacture of claim 12, wherein the computer readable program, when executed on a computer, further causes the computer to manage network data flow by determining or revising the transmit probability as a function of the hysteresis flag state.

14. The article of manufacture of claim 13, wherein the computer readable program, when executed on a computer, further causes the computer to manage network data flow by:
  determining or revising the transmit probability by defining the transmit probability as a transmit fraction Ti as a function of a data flow parameter fi and a service rate S of the network system by applying a bandwidth allocation transmit algorithm comprising;
  determining if the hysteresis flag is ON or OFF;
  if the flag is ON, incrementing or decrementing Ti by:

if $fi(t)<=fi,min$, then $Ti(t+dt)=min(1, Ti(t)+w)$;

if $fi(t)>fi,max$, then $Ti(t+dt)=Ti(t)(1-w)$;

if an excess bandwidth signal B(t)=1, then Ti(t+dt)=min(1, Ti(t)+CiBavg(t); or else, $Ti(t+dt)=Ti(t)(1-DiOi(t))$;

where Oi(t) is a current offered rate of the flow and Ci is an increment constant equal to (S+fi,min−(fl,min+f2, min +...+fn,min))/16, and Di is a decrement constant equal to (S−fi,min)*4; or if the hysteresis flag is OFF, incrementing or decrementing Ti by:
    if the queue level is increasing, setting Ti=F(Ci), wherein F(Ci) is a bandwidth allocation transmit decreasing function; or
    if the queue level is decreasing, setting Ti=G(Di), wherein G(Di) is a bandwidth allocation transmit increasing function.

15. The article of manufacture of claim 14, wherein F(Ci) =Ci/2 and G(Di)=min(1,2*Di).

* * * * *